US012617303B2

(12) United States Patent
Ge et al.

(10) Patent No.: US 12,617,303 B2
(45) Date of Patent: May 5, 2026

(54) VEHICULAR ELECTRIC DRIVE SYSTEM INCLUDING TRACTION BATTERY, INVERTER, AND MOTOR HAVING SELF-HEATER ARRANGEMENT

(71) Applicant: Ford Global Technologies, LLC, Dearborn, MI (US)

(72) Inventors: Baoming Ge, Okemos, MI (US); Petros G. Taskas, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 225 days.

(21) Appl. No.: 18/358,096

(22) Filed: Jul. 25, 2023

(65) Prior Publication Data

US 2025/0033499 A1      Jan. 30, 2025

(51) Int. Cl.
| | |
|---|---|
| *B60L 53/22* | (2019.01) |
| *B60L 58/27* | (2019.01) |
| *H01M 10/42* | (2006.01) |
| *H01M 10/615* | (2014.01) |
| *H01M 10/625* | (2014.01) |
| *H01M 10/637* | (2014.01) |
| *H01M 10/657* | (2014.01) |
| *H02P 27/08* | (2006.01) |

(52) U.S. Cl.
CPC .............. *B60L 53/22* (2019.02); *B60L 58/27* (2019.02); *H01M 10/425* (2013.01); *H01M 10/615* (2015.04); *H01M 10/625* (2015.04); *H01M 10/637* (2015.04); *H01M 10/657* (2015.04); *H02P 27/08* (2013.01); *B60L 2210/14* (2013.01); *B60L 2210/20* (2013.01);

*B60L 2210/40* (2013.01); *B60L 2240/545* (2013.01); *H01M 2220/20* (2013.01)

(58) Field of Classification Search
CPC ...... B60L 53/22; B60L 58/27; B60L 2210/14; B60L 2210/20; B60L 2210/40; B60L 2240/545; H01M 10/425; H01M 10/615; H01M 10/625; H01M 10/637; H01M 10/657; H01M 2220/20; H02P 27/08; H02P 27/085; H02P 29/64
USPC ......................................................... 701/22
See application file for complete search history.

(56) References Cited

U.S. PATENT DOCUMENTS

| | | | | | |
|---|---|---|---|---|---|
| 5,414,339 | A * | 5/1995 | Masaki | ................. | B60L 3/0092 |
| | | | | | 363/56.02 |
| 6,882,061 | B1 * | 4/2005 | Ashtiani | ............. | H02J 7/00712 |
| | | | | | 219/209 |
| 8,084,154 | B2 * | 12/2011 | Scheucher | ................ | B60L 8/00 |
| | | | | | 429/96 |
| 9,327,611 | B2 * | 5/2016 | Nishi | .................. | H01M 10/657 |
| 9,837,952 | B1 * | 12/2017 | Carcia | ..................... | H02P 27/08 |

(Continued)

*Primary Examiner* — Tuan C To
*Assistant Examiner* — Dominick Mulder
(74) *Attorney, Agent, or Firm* — David B. Kelley; Brooks Kushman P.C.

(57) ABSTRACT

A system for an electrified vehicle, such as a battery electric vehicle (BEV), includes an inverter connected between a battery and a motor having windings. A center-tap of the battery and a neutral-point of the windings are connected whereby the battery, the inverter, and the motor are connected in a closed circuit. The system further includes a controller configured to control the inverter to cause a circulating current from the battery through the closed circuit to thereby achieve a target temperature of the battery.

18 Claims, 7 Drawing Sheets

(56)　　　References Cited

U.S. PATENT DOCUMENTS

| | | | | | |
|---|---|---|---|---|---|
| 10,369,900 | B1* | 8/2019 | Conlon | .................. | B60L 53/14 |
| 10,705,128 | B2* | 7/2020 | Potempa | ................ | G01R 27/08 |
| 10,730,403 | B2 | 8/2020 | Porras et al. | | |
| 10,757,843 | B2 | 8/2020 | Chen et al. | | |
| 2002/0043946 | A1* | 4/2002 | Yoshimura | ............... | H02P 6/24 |
| | | | | | 318/139 |
| 2006/0290325 | A1* | 12/2006 | Ashtiani | ................ | B60L 58/27 |
| | | | | | 322/33 |
| 2007/0152624 | A1* | 7/2007 | Hamaoka | ............... | H02P 29/68 |
| | | | | | 318/805 |
| 2010/0100266 | A1 | 4/2010 | Yoshinori et al. | | |
| 2012/0217918 | A1* | 8/2012 | Januschevski | ...... | H02P 29/0241 |
| | | | | | 318/400.27 |
| 2013/0169038 | A1* | 7/2013 | King | ...................... | H02J 7/663 |
| | | | | | 307/66 |
| 2016/0221462 | A1* | 8/2016 | Ripoll | .................... | B60L 53/60 |
| 2017/0207712 | A1* | 7/2017 | Chiang | ............. | H02M 3/33571 |
| 2018/0026550 | A1* | 1/2018 | Dent | ......................... | H02J 7/35 |
| | | | | | 363/55 |
| 2018/0254732 | A1* | 9/2018 | Smolenaers | .............. | H02J 1/12 |
| 2018/0334043 | A1* | 11/2018 | Zou | ........................ | B60L 53/22 |
| 2021/0043990 | A1 | 2/2021 | Dan et al. | | |
| 2021/0218085 | A1 | 7/2021 | Ge et al. | | |
| 2021/0257950 | A1* | 8/2021 | Taniguchi | ............ | H02P 27/085 |
| 2022/0041031 | A1* | 2/2022 | Huang | ................... | B60L 58/27 |
| 2022/0223937 | A1 | 7/2022 | Xu et al. | | |
| 2023/0038790 | A1* | 2/2023 | Ling | ...................... | B60L 58/27 |
| 2023/0130303 | A1* | 4/2023 | Huang | ............. | H02M 7/53876 |
| | | | | | 318/139 |
| 2024/0001776 | A1* | 1/2024 | Shi | .......................... | H02P 21/22 |
| 2024/0375547 | A1* | 11/2024 | Lian | ....................... | B60L 58/25 |
| 2024/0405307 | A1* | 12/2024 | Amorim Torres | ...... | B60L 58/27 |
| 2025/0018833 | A1* | 1/2025 | Zhao | .................. | H01M 10/625 |

* cited by examiner

*(Background)*

VEHICULAR ELECTRIC DRIVE SYSTEM INCLUDING TRACTION BATTERY, INVERTER, AND MOTOR HAVING SELF-HEATER ARRANGEMENT

TECHNICAL FIELD

The present disclosure relates to utilizing a traction battery, an inverter, and windings of a motor of an electric drive system of an electrified vehicle to heat the traction battery and transmission fluid of the motor.

BACKGROUND

An electrified vehicle includes an electric drive system having a traction battery, an inverter, and a motor. The motor is powered with electrical energy from the traction battery via the inverter to propel the electrified vehicle.

SUMMARY

A system having an inverter and a controller is provided. The inverter is connected between a battery and a motor having windings. A center-tap of the battery and a neutral-point of the windings are connected whereby the battery, the inverter, and the motor are connected in a closed circuit. The controller is configured to control the inverter to cause a circulating current from the battery through the closed circuit to thereby achieve a target temperature of the battery.

The controller may control the inverter to control an amplitude and/or a frequency of the circulating current.

The circulating current may be an alternating current (AC) square wave.

The system may further include a conductor having a switch movable between an opened position and a closed position. The center-tap of the battery and the neutral-point of the windings are connected via the conductor when the switch is closed. The center-tap of the battery and the neutral-point of the windings are disconnected when the switch is opened.

The controller may move the switch between the opened position and the closed position. The inverter may drive the motor with electrical power from the battery while the switch is in the opened position. The inverter may supply the battery with electrical power received via the motor while the switch is in the opened position.

The battery may include a top battery bank and a bottom battery bank with a cathode of the top battery pack and an anode of the bottom battery pack being connected together at the center-tap of the battery. A voltage of the top battery bank and a voltage of the bottom battery bank may be substantially the same.

A method for use with an electric drive system (EDS) of a vehicle is provided. The EDS has a traction battery, a motor having a plurality of motor windings, and an inverter connected between the traction battery and the motor. The method includes connecting a center-tap of the traction battery and a neutral-point of the motor windings together whereby the battery, the inverter, and the motor are connected in a closed circuit. The method further includes controlling the inverter to cause a circulating current from the traction battery through the closed circuit to thereby achieve a target temperature of the traction battery.

The step of connecting the center-tap of the traction battery and the neutral-point of the motor windings together may be only performed while the vehicle is not being propelled by the motor and the target temperature of the traction battery is not achieved.

The method may further include disconnecting the center-tap of the traction battery and the neutral-point of the motor windings from one another while the vehicle is to be propelled by the motor and controlling the inverter to drive the motor with electrical power from the traction battery for the motor to propel the vehicle.

An EDS of a vehicle in which the EDS has a traction battery, a motor having a plurality of motor windings, and an inverter connected between the battery and the motor is provided. The EDS further has a conductor having a switch movable between an opened position and a closed position. A center-tap of the traction battery and a neutral-point of the motor windings are connected together via the conductor when the switch is in the closed position whereby the traction battery, the inverter, and the motor are connected in a closed circuit when the switch is in the closed position. A controller associated with the EDS is configured to control the inverter when the switch is in the closed position to cause a circulating current from the traction battery through the closed circuit to thereby generate heat for warming the traction battery and transmission fluid of the motor.

The controller may move the switch to the closed position while the vehicle is not being propelled by the motor and a target temperature of the traction battery and the motor windings is not achieved.

The controller may move the switch to the opened position while the vehicle is to be propelled by the motor and may control the inverter to drive the motor with electrical power from the traction battery for the motor to propel the vehicle.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
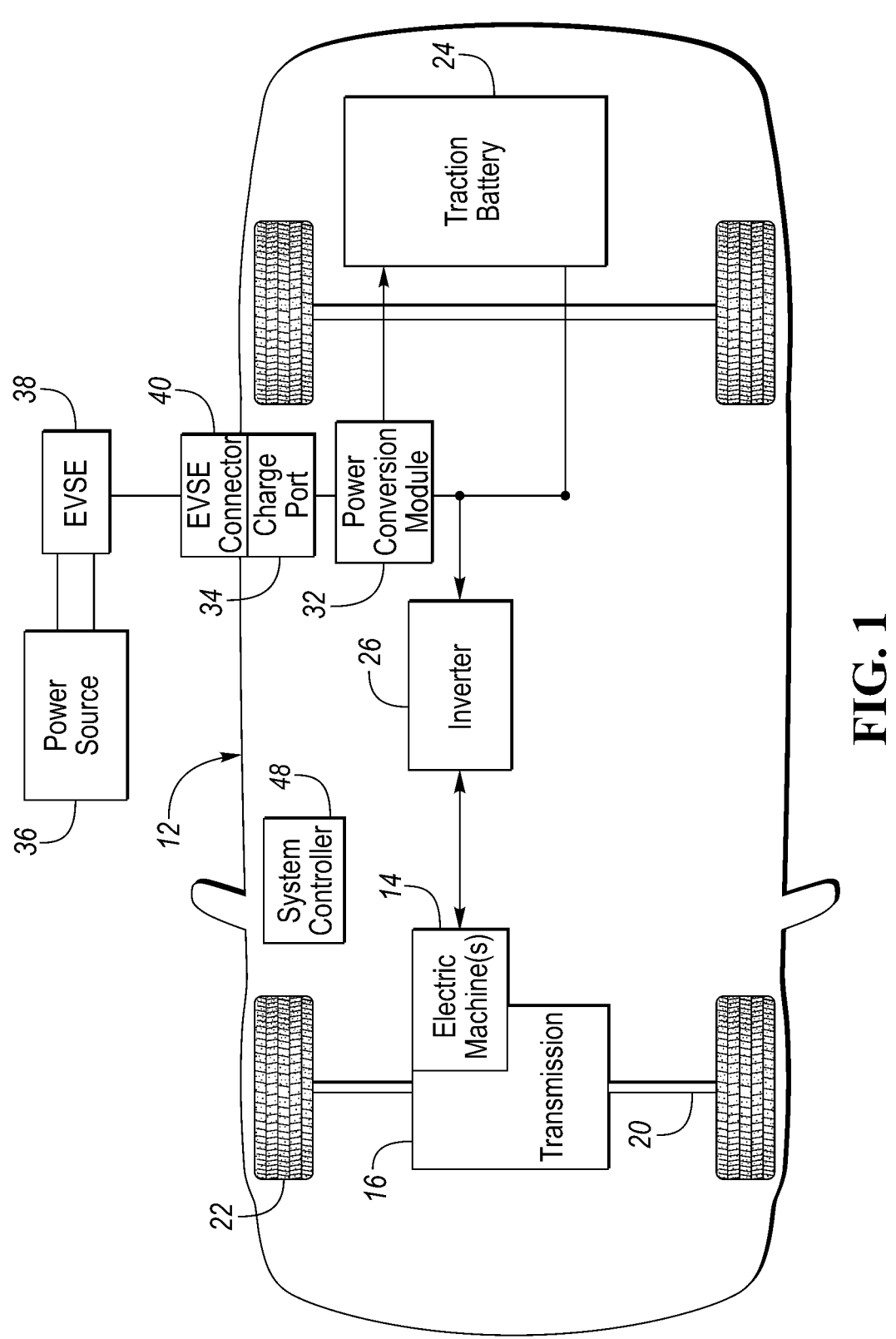
FIG. 1 illustrates a block diagram of a battery electric vehicle (BEV) having an electric drive system (EDS) including a traction battery, an inverter, and a motor.

Referring now to FIG. 1, a block diagram of an electrified vehicle 12 in the form of a battery electric vehicle (BEV) is shown. BEV 12 has an electric drive system (EDS) including one or more motors ("electric machine(s)") 14, a traction battery ("battery" or "battery pack") 24, and a power electronics module in the form of an inverter 26 (or inverter system controller (ISC)). In the BEV configuration, traction battery 24 provides all of the propulsion power with the electrified vehicle not having an engine. In other variations, the electrified vehicle may be a plug-in (or non-plug-in) hybrid electric vehicle (HEV) further having an engine.

Motor 14 is part of the EDS of BEV 12 for powering movement of the BEV. In this regard, motor 14 is mechanically connected to a transmission 16 of BEV 12. Transmission 16 is mechanically connected to a drive shaft 20 that is mechanically connected to wheels 22 of BEV 12. Motor 14 can provide propulsion capability to BEV 12 but is also capable of operating as a generator. Motor 14 acting as a generator can recover energy that may normally be lost as heat in a friction braking system of BEV 12.

Traction battery 24 stores electrical energy that can be used by motor 14 for propelling BEV 12. Traction battery 24 typically provides a high-voltage (HV) direct current (DC) output. Traction battery 24 is electrically connected to inverter 26. Motor 14 is also electrically connected to inverter 26. Inverter 26 provides the ability to bi-directionally transfer energy between traction battery 24 and motor 14. For example, traction battery 24 provides a DC voltage while motor 14 require an alternating current (AC) current (e.g., a three-phase AC current) to function. Inverter 26 may convert the DC voltage to a three-phase AC current to operate motor 14. In a regenerative mode, inverter 26 may convert three-phase AC current from motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of BEV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. Controller 48 may be a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Traction battery 24 may have one or more temperature sensors such as thermistors in communication with controller 48 to provide data indicative of the temperature of the traction battery for the controller to monitor the temperature of the traction battery. BEV 12 may further include a temperature sensor to provide data indicative of ambient temperature for controller 48 to monitor the ambient temperature.

Figure 2:
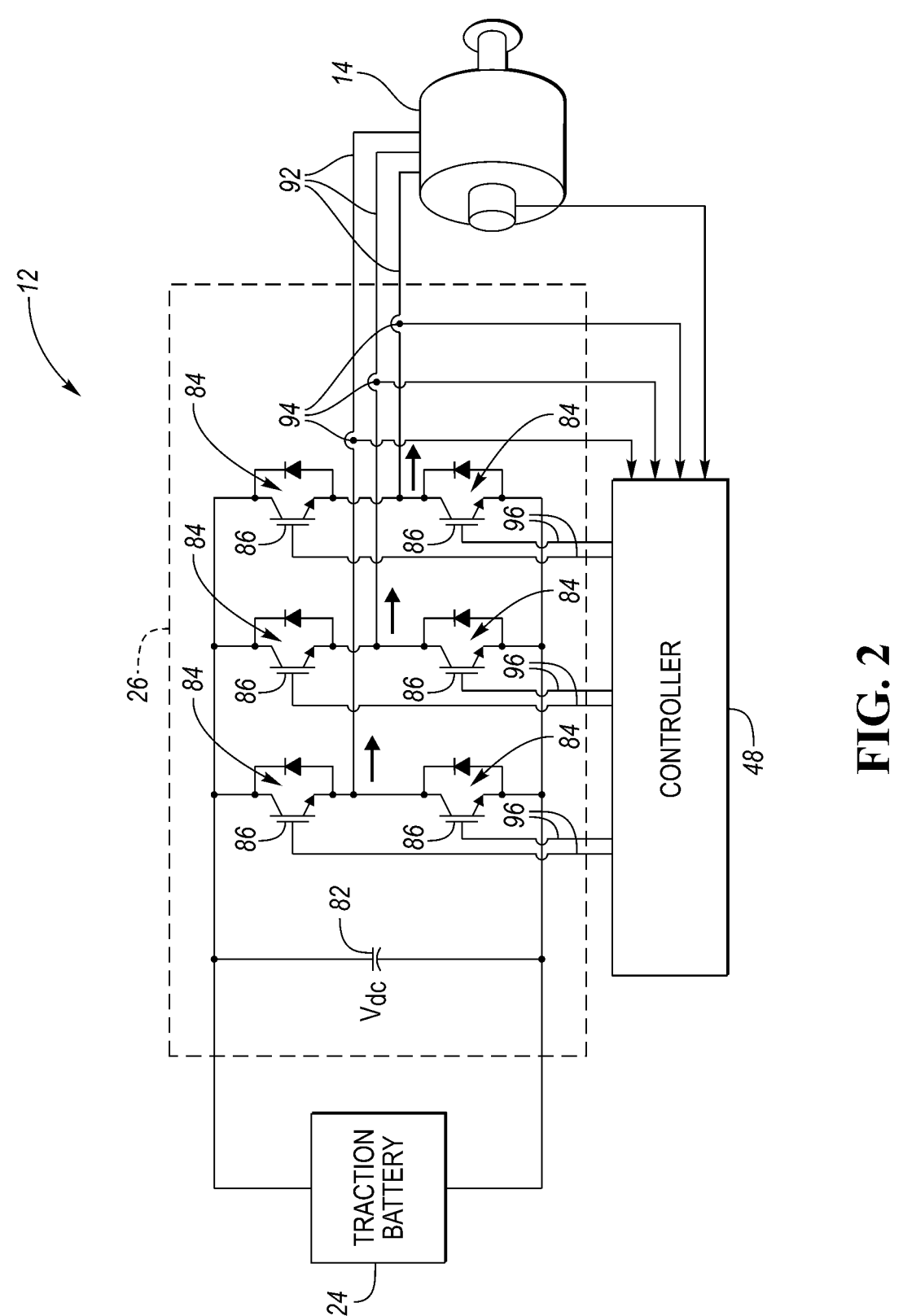
FIG. 2 illustrates a functional diagram of the traction battery, the inverter, and the motor of the EDS and a controller for the EDS.

Referring now to FIG. 2, with continual reference to FIG. 1, a functional diagram of traction battery 24, inverter 26, and motor 14 of the EDS and controller 48 for the EDS is shown. As noted above, inverter 26 is coupled between traction battery 24 and motor 14. Inverter 26 converts DC electrical power provided from traction battery 24 into AC electrical power for providing to motor 14. In this way, inverter 26 drives motor 14 with power from traction battery 24 for the motor to propel BEV 12. A DC-link capacitor ($V_{dc}$) 82 is connected in parallel with traction battery 24 and is disposed between the traction battery and inverter 26.

Controller 48 is operable to control inverter 26 for the inverter to transfer electrical power from traction battery 24 for driving (i.e., motoring) motor 14. Particularly, controller 48 controls power switches 86 of inverter 26 to open and close (e.g., switch on-and-off) pursuant to selected switching frequencies and selected duty cycles for the inverter to transfer electrical power from traction battery 24 to motor 14.

Inverter 26 includes three sets of pairs of power switching units 84 (i.e., three sets of two power switching units 84 per pair equals a total of six power switching units 84 as shown in FIG. 2). Each set pair of power switching units 84 includes two power switches 86 connected at a common bridge node (i.e., an upper power switch and a lower power switch in each of three legs or "phases" of inverter 26). In this example, each power switch 86 is a transistor in the form of an insulated gate bipolar transistor (IGBT).

Each set pair of power switching units 84 is connected in parallel to traction battery 24 and thereby each set pair of power switching units forms a phase of inverter 26. Power switches 86 of each of the three phases (i.e., phases A, B, and C) are electrically connected via power conductors 92 to respective ones of three windings of motor 14. Current sensors 94 may be disposed to monitor electrical current (i.e., current $I_a$ of phase A, current $I_b$ of phase B, and current $I_c$ of phase C) in power conductors 92. In this way, inverter 26, having three set pairs of power switching units 84, is a three-phase inverter operable for converting DC electrical power from traction battery 24 into three-phase AC electrical power for providing to motor 14.

As indicated, controller 48 is operable to control the on-and-off switching operation of power switches 86 to cause inverter 26 to convert a given DC electrical power provided from traction battery 24 into a desired AC electrical power for providing to motor 14. In operation, controller 48 receives motor control commands and controls states of inverter 26 to provide motor drive functionalities. Controller 48 monitors signal inputs from current sensors 94 and from position sensors associated with motor 14. Controller 48 communicates control signals via control lines 96 to individual ones of power switches 86. Controller 48 includes control circuits, algorithms, and other control elements to generate the control signals. Power switches 86 control the phase currents (i.e., $I_a$, $I_b$, and $I_c$) which are transferred via power conductors 92 to the motor windings for motor 14 to generate power in the form of torque and/or rotational speed based upon the motor position and/or the motor speed.

In controlling inverter 26 to drive motor 14 with the desired AC electrical power, controller 48 controls the operation of power switches 86 according to pulse-width-modulated (PWM) control strategies. In this regard, controller 48 generates a PWM control signal having a selected carrier switching frequency and a selected duty cycle. Power switches 86 in response to PWM control signals switch on-and-off according to the switching frequency and the duty cycle of the PWM control signals. (Ordinarily, the PWM control signal is such that when one power switch in a phase is switched on, the other power switch in that phase is switched off.) In this way, power switches 86 are driven at a particular switching frequency and within each cycle of the switching frequency the power switches may be operated at a specified duty cycle. Motor 14 is correspondingly driven pursuant to the operation of power switches 86 such as to thereby propel BEV 12.

The performance of traction battery 24, such as in the form of a lithium-ion traction battery, is generally best when the traction battery is not cold. Ordinarily, the temperature of traction battery 24 being within a range of generally 10° C. to 30° C. or higher is preferred for fast charging and vehicle driving operations. For instance, charging, particularly fast charging, of traction battery 24 may be limited when the traction battery is cold. Therefore, maintaining the temperature of traction battery 24 greater than a cold temperature threshold is desired. Particularly, being able to heat traction battery 24 when the traction battery is cold so that the traction battery is no longer cold is desired.

Likewise, the performance of motor 14 is generally best when transmission fluid of motor 14 is not cold. Therefore, maintaining the temperature of the transmission fluid of motor 14 greater than a cold temperature threshold is desired. Particularly, being able to heat the motor transmission fluid when the motor transmission fluid is cold so that the motor transmission fluid is no longer cold is desired.

Typically, electrified vehicles further include a thermal arrangement having a heating loop comprised of conduits, pumps, etc., and the ability to circulate heating fluid (i.e., coolant) to the traction battery for heating the traction battery. The thermal arrangement further includes a coolant heater to warm the coolant being circulated to the traction battery. The coolant heater is ordinarily an electric-resistance heater such as a positive temperature coefficient (PTC) heater. An issue is that such an electric-resistance heater requires a relatively large amount of electrical power for its operation. The electrical power is provided either by the traction battery, which thereby reduces vehicle range, or by an external power source, such as when the traction battery is being recharged. In operation, the thermal arrangement first converts electrical energy to mechanical heat (using the coolant heater) and during this process some energy will be lost. Then the mechanical heat from the coolant goes to heat the traction battery and during this process some more energy will be lost. This makes the thermal arrangement relatively inefficient. Further, the thermal arrangement as described does not accommodate for heating the transmission fluid of the motor.

Figure 3:
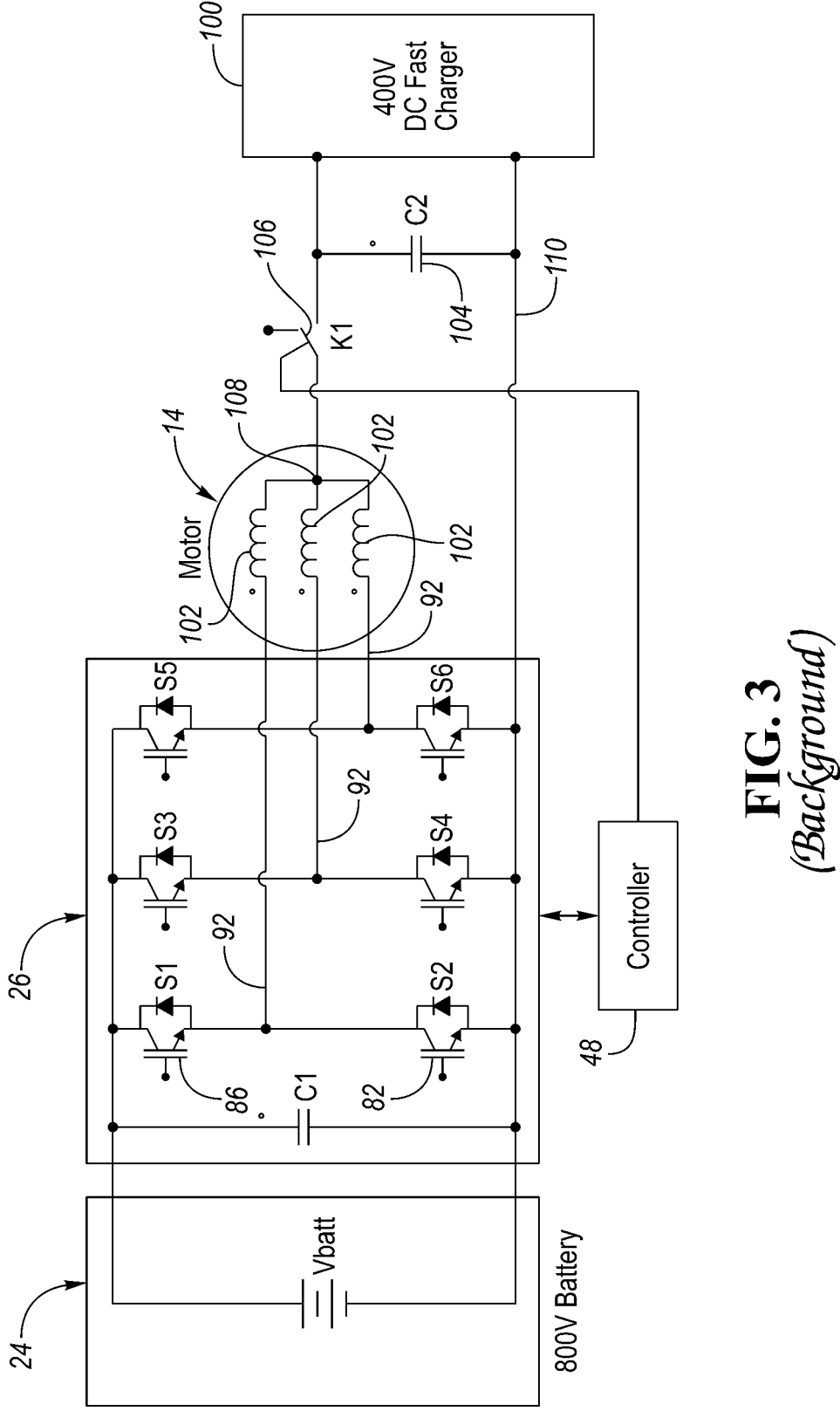
FIG. 3 illustrates a circuit topology diagram of the traction battery, the inverter, and the motor of the EDS in operative order with a fast charger according to a conventional arrangement for the fast charger to charge the traction battery.

Referring now to FIG. 3, with continual reference to FIGS. 1 and 2, a circuit topology diagram of traction battery 24, inverter 26, and motor 14 of the EDS in operative order with a fast charger 100 according to a conventional arrangement for the fast charger to charge the traction battery is shown. As indicated in FIG. 3, fast charger 100 is a 400 V DC fast charger. 400 V DC fast charger 100 may supply 400 V DC electricity for traction battery charging.

Many EVSE have 400 V DC fast chargers and the traction batteries of many electrified vehicles are 400 V DC traction batteries. As such, 400 V DC fast chargers were originally intended for charging 400 V DC traction batteries. However, it has become popular for the traction batteries to be 800 V DC traction batteries. That is, it has become popular for a BEV to use an 800 V DC traction battery and an 800 V DC bus. As such, traction battery 24 will be considered to be an 800 V DC traction battery, as indicated in FIG. 3.

An 800 V DC fast charger may supply 800 V DC electricity for traction battery charging. For optimal charging performance of traction battery 24 (i.e., an 800 V DC traction battery), an 800 V DC fast charger should be used in place of 400 V DC fast charger 100 to charge the traction battery. An issue arises when an EVSE has a 400 V DC fast charger but does not have an 800 V DC fast charger.

The conventional arrangement shown in FIG. 3 provides a solution for charging 800 V DC traction battery 24 using 400 V DC fast charger 100. In this regard, the conventional arrangement employs a boost converter consisting of the motor windings (i.e., windings 102 of motor 14) and inverter 26. Per the conventional arrangement, as shown in FIG. 3, 400 V DC fast charger 100 is connected in parallel with a capacitor (C2) 104. 400 V DC fast charger 100 with capacitor 104 parallel-connected thereto are connectable through a first switch (K1) 106 to motor 14. Particularly, when first switch 106 is closed (first switch 106 is shown opened in FIG. 3—controller 48 is operable to control first switch 106 to open and close), 400 V DC fast charger 100 with capacitor 104 parallel-connected thereto are connected between a neutral-point 108 of windings 102 of motor 14 and a ground point 110 of the EDS. In turn, controller 48 controls inverter 26 to operate in a voltage boost mode to boost the 400 V DC voltage from 400 V DC fast charger 100 into an 800 V DC voltage and to provide the 800 V DC voltage, via DC-link capacitor 82, to traction battery 24 to charge the traction battery.

However, as noted above, fast charging of traction battery 24, such as with the use of 400 V DC fast charger 100, may be limited when the traction battery is cold. As such, heating traction battery 24 to a temperature within an optimal temperature range is desired in cold temperatures to implement DC fast charging.

In accordance with the present disclosure, traction battery 24, inverter 26, and motor 14 of the EDS have a self-heater arrangement for heating the traction battery and the transmission fluid of the motor. The self-heater arrangement implements a relatively high-efficient and relatively economically-effective self-heater for traction battery 24 and the motor transmission fluid to overcome the issues with the thermal arrangement.

In operation of the self-heater arrangement during a heating mode, current from traction battery 24 is circulated through the traction battery, inverter 26, and motor windings 102 for heating the traction battery and the transmission fluid of the motor. As explained in further detail below, in the heating mode, traction battery 24, inverter 26, and motor 14 are connected in a closed circuit and controller 48 controls the inverter to cause the circulating current through the closed circuit. The circulating current causes heat which heats up traction battery 24 and transmission fluid of motor 14. After traction battery 24 is heated from the circulating current to a desired temperature, the heating mode may be terminated and the closed circuit of traction battery 24, inverter 26, and motor 14 is disconnected. 400 V DC fast charger 100 can then be connected to the EDS to charge traction battery 24.

A feature of the self-heater arrangement is that an amplitude and a frequency of the circulating current are controllable by controller 48. As such, the self-heater arrangement is a current amplitude and frequency controllable self-heater arrangement.

Figure 4:
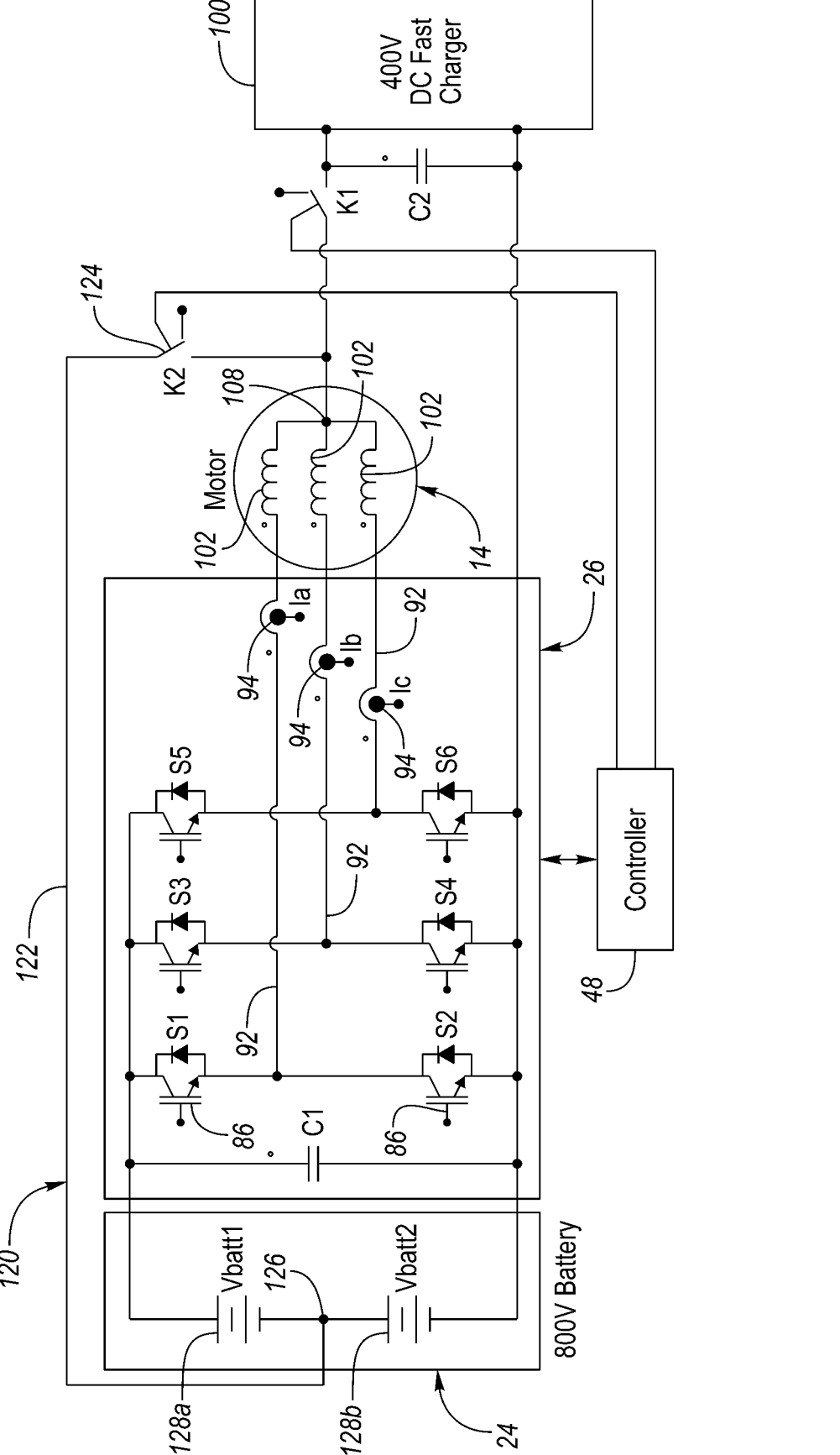
FIG. 4 illustrates a circuit topology diagram of the traction battery, the inverter, and the motor of the EDS having a self-heater arrangement, the self-heater arrangement being made operative in a heating mode with the use of the controller to generate a circulating current from the traction battery to cause heat for heating the traction battery and transmission fluid of the motor, an amplitude and a frequency of the circulating current being controllable according to the self-heater arrangement.

Referring now to FIG. 4, with continual reference to FIGS. 1, 2, and 3, a circuit topology diagram of traction battery 24, inverter 26, and motor 14 of the EDS having the self-heater arrangement is shown. As noted, the self-heater arrangement is made operative in the heating mode with the use of controller 48 to generate a circulating current from traction battery 24 to cause heat for heating the traction battery and motor transmission fluid, and the amplitude and the frequency of the circulating current are controllable.

The self-heater arrangement includes a hardware circuit 120 and a control algorithm carried out by controller 48. The control algorithm involves controller 48 controlling hardware circuit 120 and inverter 26 to operate in specific manners, as described in detail below, whereby the control algorithm results in a new operation mode and controllable circulating current amplitude and frequency.

The circuit topology diagram of FIG. 4 shows the circuit topology including hardware circuit 120 of the self-heater arrangement. Hardware circuit 120 includes a conductor 122 and a second switch (K2) 124. Conductor 122 is connected from a center-tap 126 of traction battery 24 to neutral-point 108 of windings 102 of motor 14 through second switch 124. As such, when second switch 124 is closed, center-tap 126 of traction battery 24 and neutral-point 108 of motor windings 102 are connected with electrical continuity. Controller 48 is operable to control second switch 124 to open and close.

Accordingly, when second switch 124 is closed, (i) traction battery 24 is connected to motor windings 102 via inverter 26 per the ordinary configuration shown in FIG. 2 and (ii) center-tap 126 of traction battery 24 is connected to neutral-point 108 of motor windings 102 via conductor 122 per the configuration employing hardware circuit 120.

Conversely, when second switch 124 is opened, center-tap 126 of traction battery 24 and neutral-point 108 of motor windings 102 are disconnected with electrical discontinuity from one another. Accordingly, when second switch 124 is opened, hardware circuit 120 is effectively non-existent, and the EDS has the ordinary configuration shown in FIG. 2.

As noted, traction battery 24 includes center-tap 126. Center-tap 126 divides traction battery 24 into first and second serially-connected battery banks 128a and 128b. In this example, battery banks 128a and 128b are roughly identical battery banks having roughly the same voltage. Consequently, as traction battery 24 is an 800 V DC battery, battery banks 128a and 128b are each 400 V DC battery banks. In this case, the voltage at center-tap 126 is 400 V, the cathode of first battery bank 128a (i.e., the top battery bank) and the anode of second battery bank 128b (i.e., the bottom battery bank) are tied to center-tap 126 and are at the voltage of 400 V, the voltage at the anode of first battery bank 128a is 800 V, and the voltage at the cathode of second battery bank 128b is tied to the ground point 110 and is 0 V.

As indicated, the self-heater arrangement utilizes inverter 26 and motor windings 102 to heat traction battery 24. This also heats the transmission fluid of motor 14.

The control algorithm of the self-heater arrangement implemented by controller 48 provides three operation modes.

The first operation mode is a vehicle propulsion mode in which the EDS is used to propel BEV 12 as is ordinarily done. In the vehicle propulsion mode, controller 48 opens first switch (K1) 106 whereby fast charger 100, if present, is disconnected from the EDS and the controller opens second switch (K2) 124 whereby hardware circuit 120 is effectively non-existent. Accordingly, the EDS has the ordinary configuration shown in FIG. 2. During the ordinary mode, controller 48 controls inverter 26 to drive motor 14 with electrical power from traction battery 24 in order for the motor to propel BEV 12. In this regard, controller 48 controls the operation of power switches 86 of inverter 26 such as according to traditional PWM control strategies. Motor 14 is correspondingly driven pursuant to the operation of power switches 86 to thereby propel BEV 12.

The second operation mode is a charging mode in which fast charger 100 is used to charge traction battery 24. In the charging mode, fast charger 100 is present, and, in this example, the fast charger is a 400 V DC fast charger. Controller 48 closes first switch (K1) 106 whereby fast charger 100 is connected to the EDS and the controller opens second switch (K2) 124 whereby hardware circuit 120 is effectively non-existent. During the charging mode, traction battery 24, which is an 800 V DC traction battery, is charged by fast charger 100 through motor windings 102 and inverter 26. Controller 48 controls power switches 86 of inverter 26 for motor windings 102 and the inverter to work together to achieve voltage boost from 400 V DC to 800 V DC and charge traction battery 24 with 800 V DC electrical energy.

The third operation mode is the heating mode in which the EDS is used to heat traction battery 24 and the transmission fluid of motor 14. The heating mode is available when traction battery 24 requires heating to reach a desired temperature, BEV 12 is not being propelled by motor 14, and the traction battery is not to be charged such as by a fast charger. In the heating mode, controller 48 opens first switch (K1) 106 whereby fast charger 100, if present, is disconnected from the EDS and the controller closes second switch (K2) 124 whereby center-tap 126 of traction battery 24 and neutral-point 108 of motor windings 102 are connected. Controller 48 controls power switches 86 of inverter 26 according to a control process 130 (shown in FIG. 5) to cause traction battery 24 to generate the circulating current through the traction battery, inverter 26, and motor 14. The circulating current will heat up first and second battery banks 128a and 128b and motor windings 102 which further heat up the motor transmission fluid.

Figures 5, 6A, 6B:
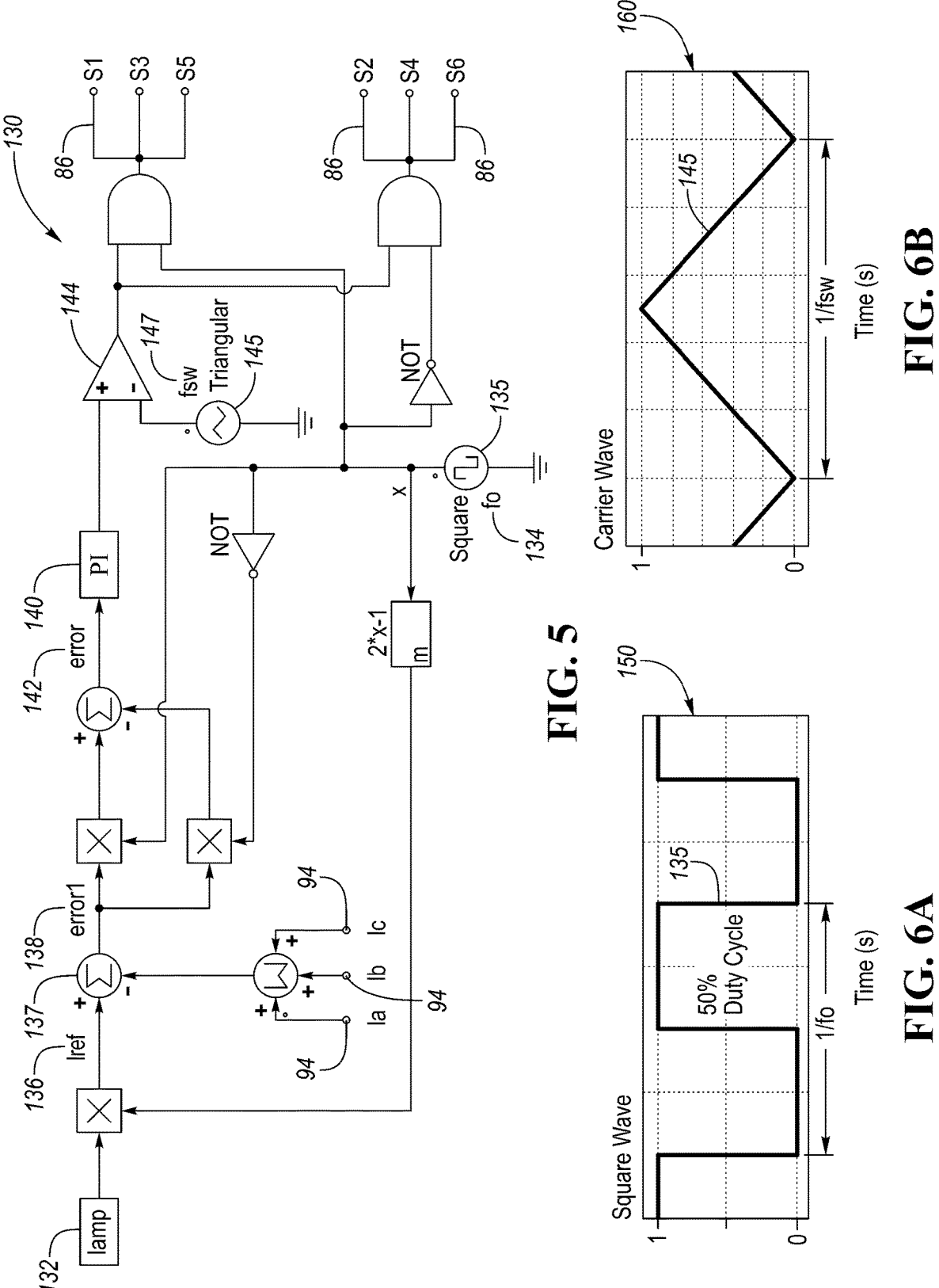
FIG. 5 illustrates a schematic circuit diagram of a control process of the self-heater arrangement for being made operative in the heating mode.
FIG. 6A illustrates a graph having a plot of a square wave for use in causing the traction battery to generate the circulating current.
FIG. 6B illustrates a graph having a plot of a triangular wave for use in controlling power switches of the inverter in causing the traction battery to generate the circulating current.

Referring now to FIG. 5, with continual reference to FIG. 4, a schematic circuit diagram of control process 130 of the self-heater arrangement for being made operative in the heating mode is shown. As shown in FIG. 5, control process 130 involves a closed-loop control strategy to cause traction battery 24 to generate the circulating current for causing heat. Current amplitude variable ($I_{amp}$) 132 is set by controller 48 to control the amplitude of the circulating current. Particularly, the amplitude of the circulating current is ½ of $I_{amp}$ (i.e., $0.5*I_{amp}$). Current frequency variable ($f_0$) 134 is set by controller 48 to control the frequency of the circulating current. Current reference ($I_{ref}$) 136 is the product of (i) the current amplitude ($I_{amp}$) and (ii) a square waveform with +1 and −1 amplitude, which is generated from a square wave 135 with +1 and 0 amplitude (FIG. 6A illustrates a graph having a plot of square wave 135).

Current sensors 94, designed in inverter 26 for the motor current closed-loop control in the vehicle propulsion mode, also feedback to controller 48 the three phase currents (current $I_a$ of phase A, current $I_b$ of phase B, and current $I_c$ of phase C) of the inverter. Controller 48 compares at comparison block 137 a sum of the phase currents ($I_a+I_b+I_c$) with current reference ($I_{ref}$) 136 to generate first error variable (error1) 138 during the closed-loop control strategy to heat up traction battery 24. Controller 48, before passing first error variable (error1) 138 to a proportional and integral (PI) governor 140 of the controller, makes an adjustment by assigning a positive or negative symbol to first error variable (error1) 138 to reflect a corresponding positive current or negative current command/feedback. After first error variable (error1) 138 is assigned a positive or negative symbol, a second error variable (error) 142 will either be +error1 or −error1. Second error variable (error) 142 is the input to PI governor 140. This process is synchronized by using a square wave 135 with +1 and 0 amplitude (again, FIG. 6A illustrates a graph having a plot of square wave 135).

Controller 48 compares at a comparator 144 the output of PI governor 140 with a triangular wave 145 (FIG. 6B illustrates a graph having a plot of triangular wave 145) to generate a duty cycle to control power switches 86 of inverter 26. A switching frequency variable ($f_{sw}$) 147 is set by controller 48 to control the frequency of triangular wave 145, thereby defining a switching frequency of power switches 86 of inverter 26. Then, one PI governor 140 controls the current of motor windings 102, tracking positive and negative current references, respectively.

Referring now to FIGS. 6A and 6B, with continual reference to FIG. 5, a graph 150 having a plot of square wave 135 and a graph 160 having a plot of triangular wave 145 are respectively shown.

As shown in FIG. 6A, square wave 135 has a 50% duty cycle and a period that is the inverse of current frequency ($f_0$) 134. As such, square wave 135 oscillates between +1 and 0 with a 50% duty cycle and has an oscillation frequency equal to current frequency ($f_0$) 134. In this way, current frequency ($f_0$) 134 defines the frequency of the circulating current between first and second battery banks 128a and 128b.

As shown in FIG. 6B, triangular wave 145, which functions as a carrier signal, has a period that is the inverse of switching frequency ($f_{sw}$) 147. As such, triangular wave 145 oscillates between +1 and 0 and has an oscillation frequency equal to switching frequency ($f_{sw}$) 147. In this way, switching frequency ($f_{sw}$) 147 defines the switching frequency of the power switches 86 of inverter 26 for causing traction battery 24 to generate the circulating current.

With reference to control process 130 of the self-heater arrangement shown in FIG. 5 and the circuit topology diagram shown in FIG. 4, when square wave 135 is at the high level (i.e., +1), a bottom bridge group of power switches 86 (labeled S2, S4, S6) of inverter 26 are switched off and the duty cycle controls a top bridge group of power switches (labeled S1, S3, S5) of inverter 26 to adjust positive circulating current. Conversely, when square wave 135 is at the low level (i.e., 0), the top bridge group of power switches 86 (S1, S3, S5) are switched off and the duty cycle controls the bottom bridge group of power switches 86 (S2, S4, S6) to adjust negative circulating current.

Figure 7A:
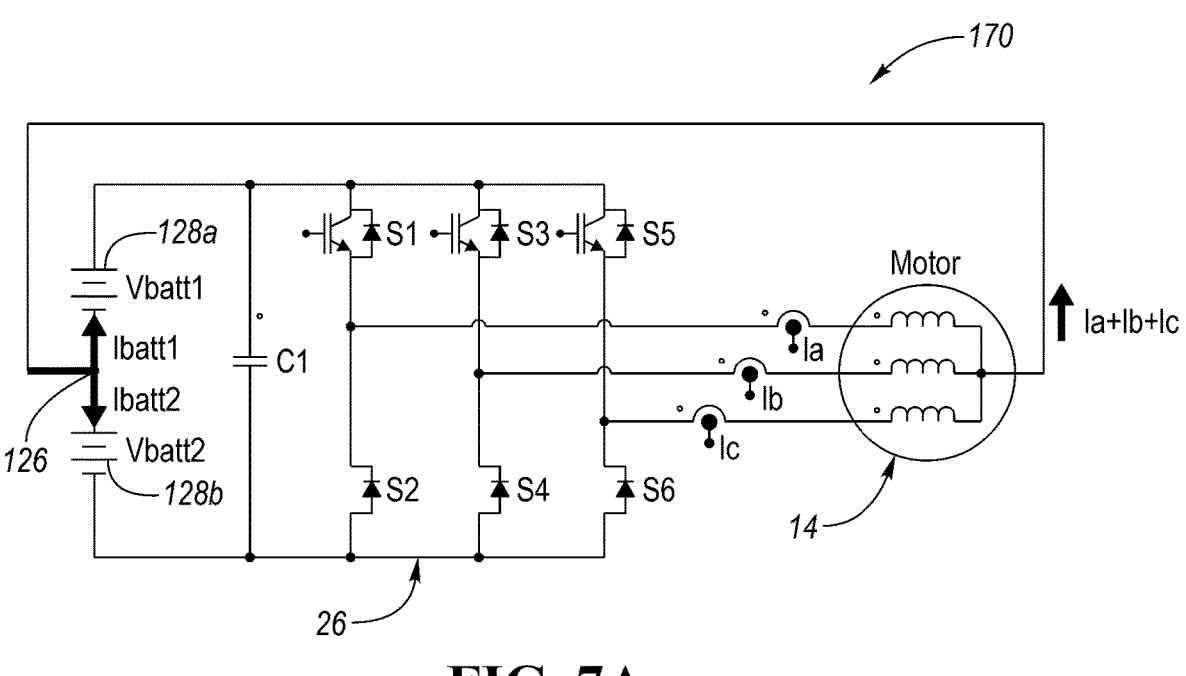
FIG. 7A illustrates a circuit topology diagram of the self-heater arrangement during the heating mode with a positive circulating current from the traction battery.
Figure 7B:
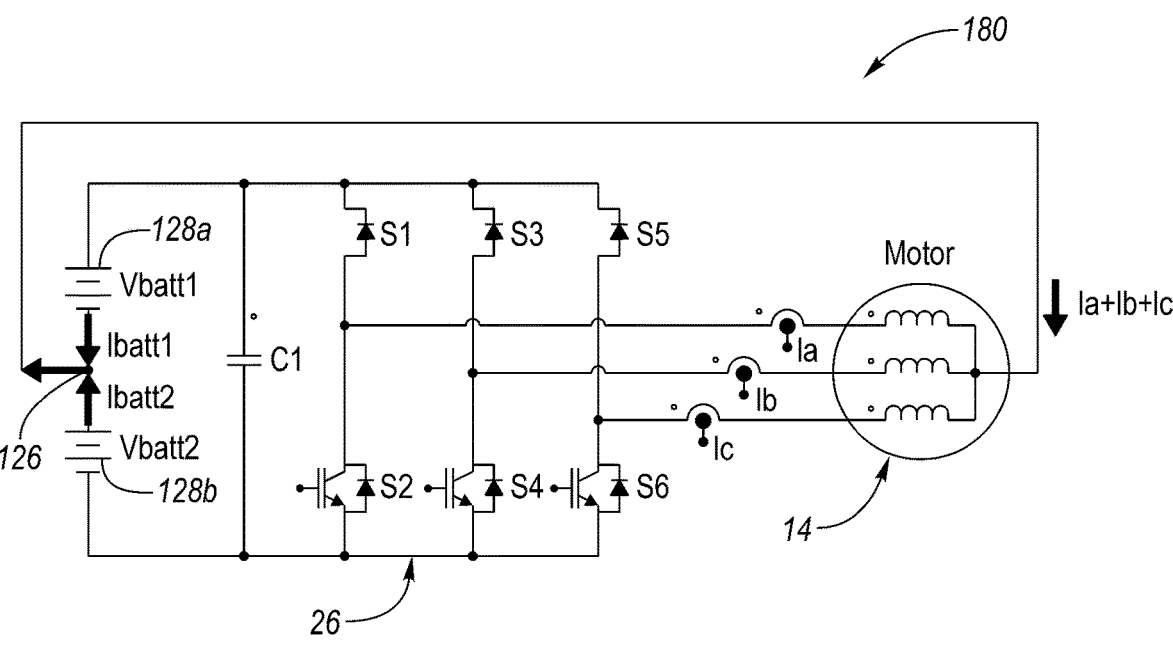
FIG. 7B illustrates a circuit topology diagram of the self-heater arrangement during the heating mode with a negative circulating current from the traction battery.

Referring now to FIGS. 7A and 7B, circuit topology diagrams 170 and 180 of the self-heater arrangement during the heating mode with a positive circulating current from traction battery 24 (FIG. 7A) and with a negative circulating current from the traction battery (FIG. 7B) are respectively shown. Each circuit topology diagram 170 and 180 shows the equivalent circuit when the EDS is operated in the heating mode.

With reference to FIG. 7A, when the motor winding current (i.e., the sum of phase currents $I_a+I_b+I_c$) is positive (i.e., the sum of phase currents $I_a+I_b+I_c$ is positive), half of the motor winding current ($I_{batt1}$) flows out of top battery bank 128a and the other half of the motor winding current ($I_{batt2}$) flows into bottom battery bank 128b. In other words, top battery bank 128a transfers energy into bottom battery bank 128b when the motor winding current is positive.

With reference to FIG. 7B, when the motor winding current is negative i.e., (the sum of phase currents $I_a+I_b+I_c$ is negative), half of the motor winding current ($I_{batt2}$) flows out of bottom battery bank 128b and the other half of the motor winding current ($I_{batt1}$) flows into top battery bank 128a. In other words, bottom battery bank 128b transfers energy into top battery bank 128a when the motor winding current is negative.

The motor winding current is indicative of the circulating current. After each cycle of positive and negative motor winding current, top and bottom battery banks 128a and 128b have the same state of charge (SOC). Controller 48 can control the frequency of the cycles as desired. Controller 48 can adjust the amplitude of the motor winding current as desired. From this current circulating process, top and bottom battery banks 128a and 128b and motor 14 are heated up.

Figure 8:
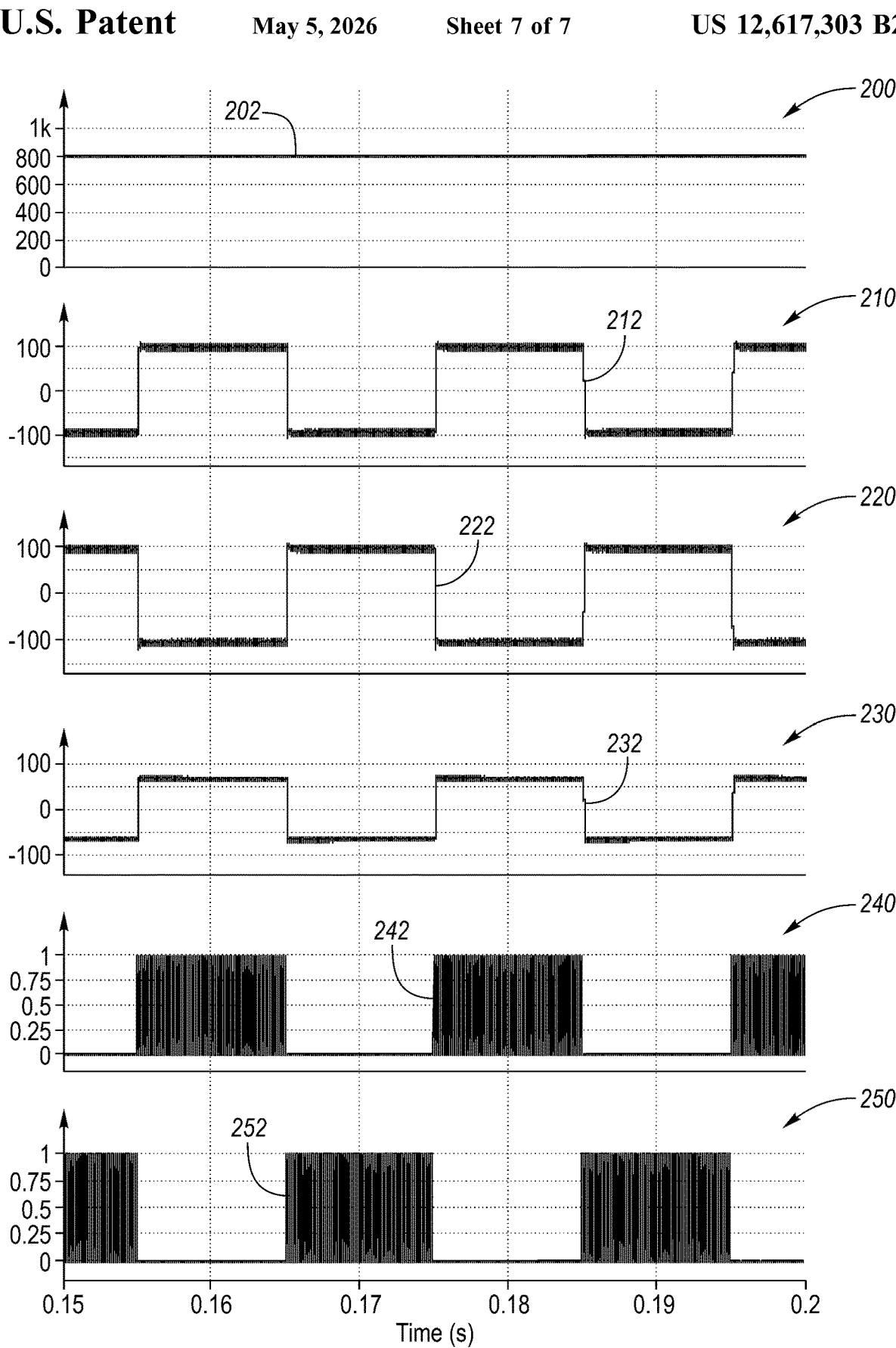
FIG. 8 illustrates graphs of simulation results of the self-heater arrangement during the heating mode, the graphs including a first graph having a plot of a voltage of the traction battery versus time, a second graph having a plot of a current of the first of two battery banks forming the traction battery versus time, a third graph having a plot of a current of the second of the two battery banks forming the traction battery versus time, a fourth graph having a plot of a current of one of the windings of the motor versus time, a fifth graph having a plot of a control signal for implementing on-and-off switching of a top bridge group of power switches of the inverter versus time, and a sixth graph having a plot of a control signal for implementing on-and-off switching of a bottom bridge group of power switches of the inverter versus time.

Simulation results of a demonstration of the self-heater arrangement of the EDS during the heating mode to heat up traction battery 24 and the transmission fluid of motor 14 will now be described with reference to FIG. 8. FIG. 8 illustrates graphs of the simulation results including a first graph 200 having a plot 202 of the voltage of traction battery 24 versus time, a second graph 210 having a plot 212 of the current of top battery bank 128a versus time, a third graph 220 having a plot 222 of the current of second battery bank 128b versus time, a fourth graph 230 having a plot 232 of the current of a motor winding 102 versus time, a fifth graph 240 having a plot 242 of a control signal for implementing the on-and-off switching of the top bridge group of power switches 86 (S1, S3, S5) versus time, and a sixth graph 250 having a plot 252 of a control signal for implementing the on-and-off switching of the bottom bridge group of power switches 86 (S2, S4, S6) versus time.

The voltage ($V_{batt}$) of traction battery 24 is 800 V, as confirmed by plot 202 of graph 200. In this simulation, the current reference $I_{amp}$=200 A, the current frequency $f_0$=50 Hz, and the switching frequency $f_{sw}$=10 kHz. As a result of the current reference lamp being 200 A, the battery current amplitude is 100 A. Accordingly, with the current frequency $f_0$ being 50 Hz in a square wave, top battery bank 128a and bottom battery bank 128b alternately have positive and negative current with a current amplitude of 100 A in the square wave with the frequency of 50 Hz, as respectively confirmed by plot 212 in graph 210 and plot 222 in graph 220. As a result of top and bottom battery banks 128a and 128b alternately having positive and negative current with the current amplitude of 100 A in the square wave with the frequency of 50 Hz, each phase current $I_a$, $I_b$, and $I_c$ of motor windings 102 has an amplitude of 66.67 A in the square wave with the frequency of 50 Hz. This is confirmed by plot 232 of graph 230 indicative of the current of one of motor windings 102 versus time.

The control signal for implementing the on-and-off switching of the top bridge group of power switches 86 (S1, S3, S5) versus time is shown by plot 242 of graph 240. The switching frequency is 10 kHz, and the duty cycle D is controlled by the current closed-loop governor PI. Likewise, the control signal for implementing the on-and-off switching of the bottom bridge group of power switches 86 (S2, S4, S6) versus time is shown by plot 252 of graph 250. Again, the switching frequency is 10 kHz, and the duty cycle D is controlled by the current closed-loop governor PI.

As described, the present disclosure provides an EDS for an electrified vehicle in which the EDS includes a traction battery, an inverter, and a motor having a self-heater arrangement. To implement the self-heater arrangement, (i) the EDS further includes a hardware circuit having a con-tactor (i.e., second switch (K2) 124) and connection wires (i.e., connector 122) between the center-tap of the traction battery and the neutral-point of the motor windings and (ii) the controller employs a new control strategy and operation modes to run the inverter, the motor windings, and the traction battery in order to generate a circulating current therethrough.

In further detail, the controller employs a new current-loop control strategy to cause the EDS to produce a current circulating between two (top and bottom) battery banks and the motor windings. This control method creates a new operation mode for the traction battery, the inverter, and the motor, where the battery current is a smooth square wave, and its amplitude and frequency are adjustable. The top and bottom battery banks are heated by a square AC current, meanwhile the batter banks always keep the same state of charge during the process.

The self-heater arrangement utilizes the already present traction battery, the inverter, and the motor windings with only additional economically-effective components (i.e., the second switch and the connector) being added.

The self-heater arrangement makes the ambient temperature irrelevant to operation of the electrified vehicle. In this regard, the traction battery temperature and the coolant temperature are automatically controlled to maintain them within a desired range. As a result, the traction battery and motor transmission fluid achieve enhanced performance no matter the ambient temperature. This eliminates the need to use a separate coolant heater as outlined above.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implement-ing embodiments may be combined to form further embodi-ments of the present disclosure.

What is claimed is:

1. A system comprising:
an inverter connected between a battery and a motor, the motor having first, second, and third windings, each winding having an input end and an output end, the output ends of the windings being connected at a neutral-point of the windings, the inverter having a first phase that is connected to the input end of the first winding, a second phase that is connected to the input end of the second winding, and a third phase that is connected to the input end of the third winding, wherein each phase has a top power switch and a bottom power switch;
a conductor connecting a center-tap of the battery and the neutral-point of the windings whereby the battery, the first, second, and third phases of the inverter, and the motor are connected in a closed circuit via the conduc-tor; and
a controller configured to switch on-and-off the top power switches of the first, second, and third phases of the inverter pursuant to a selected switching frequency while switching off the bottom power switches of the first, second, and third phases pursuant to a selected duty cycle during a first half-cycle of a circulating current and switch on-and-off the bottom power switches of the first, second, and third phases pursuant to the selected switching frequency while switching off the top power switches of the first, second, and third phases pursuant to the selected duty cycle during a second half-cycle of the circulating current such that, during each half-cycle, only one of the top power switches or the bottom power switches of each phase is actively switched while the other is held continuously in a non-conductive state for the entirety of the half-cycle to cause a circulating current, comprising suc-cessive alternating half-cycles and in a form of an alternating current (AC) square wave, from the battery through the closed circuit to thereby achieve a target temperature of the battery.

2. The system of claim 1 wherein:
the controller is further configured to control the selected switching frequency to control an amplitude of the circulating current.

3. The system of claim 1 wherein:
the controller is further configured to control a period of the selected duty cycle to control a frequency of the circulating current.

4. The system of claim 1 wherein:
the conductor has a switch movable between an opened position and a closed position;
wherein the center-tap of the battery and the neutral-point of the windings are connected via the conductor when the switch is closed; and
the center-tap of the battery and the neutral-point of the windings are disconnected when the switch is opened.

5. The system of claim 4 wherein:

the controller is configured to move the switch between the opened position and the closed position.

6. The system of claim 4 wherein:

the inverter is configured to drive the motor with electrical power from the battery while the switch is in the opened position.

7. The system of claim 4 wherein:

the inverter is configured to supply the battery with electrical power received via the motor while the switch is in the opened position.

8. The system of claim 1 wherein:

the battery includes a top battery bank and a bottom battery bank; and a cathode of the top battery pack and an anode of the bottom battery pack are connected together at the center-tap of the battery.

9. The system of claim 8 wherein:

a voltage of the top battery bank and a voltage of the bottom battery bank are substantially the same.

10. A method for use with an electric drive system of a vehicle, the electric drive system having a traction battery, a motor having first, second, and third motor windings, each motor winding having an input end and an output end, the output ends of the motor windings being connected at a neutral-point of the windings, and an inverter connected between the traction battery and the motor, the inverter having a first phase that is connected to the input end of the first motor winding, a second phase that is connected to the input end of the second motor winding, and a third phase that is connected to the input end of the third motor winding, wherein each phase has a top power switch and a bottom power switch, the method comprising:

connecting with a conductor a center-tap of the traction battery and the neutral-point of the motor windings together whereby the traction battery, the first, second, and third phases of the inverter, and the motor are connected in a closed circuit via the conductor; and switching on-and-off the top power switches of the first, second, and third phases of the inverter pursuant to a selected switching frequency while switching off the bottom power switches of the first, second, and third phases pursuant to a selected duty cycle during a first half-cycle of a circulating current and switching on-and-off the bottom power switches of the first, second, and third phases pursuant to the selected switching frequency while switching off the top power switches of the first, second, and third phases pursuant to the selected duty cycle during a second half-cycle of the circulating current such that, during each half-cycle, only one of the top power switches or the bottom power switches of each phase is actively switched while the other is held continuously in a non-conductive state for the entirety of the half-cycle to cause a circulating current, comprising successive alternating half-cycles and in a form of an alternating current (AC) square wave, from the traction battery through the closed circuit to thereby achieve a target temperature of the traction battery.

11. The method of claim 10 further comprising:

controlling the selected switching frequency to control an amplitude of the circulating current.

12. The method of claim 10 further comprising:

controlling a period of the selected duty cycle to control a frequency of the circulating current.

13. The method of claim 10 wherein:

connecting the center-tap of the traction battery and the neutral-point of the motor windings together is performed only while the vehicle is not being propelled by the motor and the target temperature of the traction battery is not achieved.

14. The method of claim 10 further comprising:

subsequently disconnecting the center-tap of the traction battery and the neutral-point of the motor windings from one another while the vehicle is to be propelled by the motor; and controlling the inverter to drive the motor with electrical power from the traction battery for the motor to propel the vehicle.

15. An electric drive system for a vehicle, the electric drive system comprising:

a traction battery;

a motor having first, second and third motor windings, each motor winding having an input end and an output end, the output ends of the motor windings being connected at a neutral-point of the windings;

an inverter connected between the traction battery and the motor, the inverter having a first phase that is connected to the input end of the first motor winding, a second phase that is connected to the input end of the second motor winding, and a third phase that is connected to the input end of the third motor winding, wherein each phase has a top power switch and a bottom power switch;

a conductor having a switch movable between an opened position and a closed position;

wherein a center-tap of the traction battery and the neutral-point of the motor windings are connected together via the conductor when the switch is in the closed position whereby the traction battery, the first, second, and third phases of the inverter, and the motor are connected in a closed circuit via the conductor when the switch is in the closed position; and a controller configured to switch on-and-off the top power switches of the first, second, and third phases of the inverter pursuant to a selected switching frequency while switching off the bottom power switches of the first, second, and third phases pursuant to a selected duty cycle during a first half-cycle of a circulating current and switch on-and-off the bottom power switches of the first, second, and third phases pursuant to the selected switching frequency while switching off the top power switches of the first, second, and third phases pursuant to the selected duty cycle during a second half-cycle of the circulating current such that, during each half-cycle, only one of the top power switches or the bottom power switches of each phase is actively switched while the other is held continuously in a non-conductive state for the entirety of the half-cycle when the switch is in the closed position to cause a circulating current, in a form of an alternating current (AC) square wave, from the traction battery through the closed circuit to thereby generate heat for warming the traction battery and transmission fluid of the motor.

16. The electric drive system of claim 15 wherein:

the controller is further configured to control the selected switching frequency to control an amplitude of the circulating current and/or control a period of the selected duty cycle to control a frequency of the circulating current.

17. The electric drive system of claim 15 wherein:

the controller is configured to move the switch to the closed position while the vehicle is not being propelled by the motor and a target temperature of the traction battery and the motor windings is not achieved.

18. The electric drive system of claim 15 wherein:

the controller is configured to move the switch to the opened position while the vehicle is to be propelled by the motor and the controller is further configured to control the inverter to drive the motor with electrical power from the traction battery for the motor to propel the vehicle.

* * * * *